(12) United States Patent
Chen et al.

(10) Patent No.: US 11,802,229 B2
(45) Date of Patent: Oct. 31, 2023

(54) LOW-MODULUS HIGH-ADHESION SILANE-MODIFIED POLYETHER SEALANT FOR PREFABRICATED BUILDING, AND PREPARATION METHOD THEREFOR

(71) Applicant: GUANGZHOU BAIYUN CHEMICAL INDUSTRY CO., LTD., Guangzhou (CN)

(72) Inventors: Jianjun Chen, Guangzhou (CN); Zien Fu, Guangzhou (CN); Hengchao Huang, Guangzhou (CN); Yangqing Chen, Guangzhou (CN); Fei Long, Guangzhou (CN); Suhan Yang, Guangzhou (CN); Guanghua Liu, Guangzhou (CN)

(73) Assignee: GUANGZHOU BAIYUN CHEMICAL INDUSTRY CO., LTD., Guangzhou (CN)

( * ) Notice: Subject to any disclaimer, the term of this patent is extended or adjusted under 35 U.S.C. 154(b) by 717 days.

(21) Appl. No.: 16/770,864

(22) PCT Filed: Dec. 28, 2017

(86) PCT No.: PCT/CN2017/119482
§ 371 (c)(1),
(2) Date: Jun. 8, 2020

(87) PCT Pub. No.: WO2019/127239
PCT Pub. Date: Jul. 4, 2019

(65) Prior Publication Data
US 2021/0163803 A1    Jun. 3, 2021

(51) Int. Cl.
| | |
|---|---|
| C09K 3/10 | (2006.01) |
| C08G 59/02 | (2006.01) |
| C08G 59/06 | (2006.01) |
| C08G 59/72 | (2006.01) |
| C08K 3/04 | (2006.01) |
| C08K 3/36 | (2006.01) |
| C08K 3/40 | (2006.01) |
| C08K 5/053 | (2006.01) |
| C08K 5/17 | (2006.01) |
| C08K 5/3472 | (2006.01) |
| C08K 5/5419 | (2006.01) |
| C08K 7/28 | (2006.01) |
| C08L 71/02 | (2006.01) |
| C08K 3/22 | (2006.01) |

(Continued)

(52) U.S. Cl.
CPC .......... C09K 3/1006 (2013.01); C08G 59/022 (2013.01); C08G 59/063 (2013.01); C08G 59/72 (2013.01); C08K 3/04 (2013.01); C08K 3/36 (2013.01); C08K 3/40 (2013.01); C08K 5/053 (2013.01); C08K 5/17 (2013.01); C08K 5/3472 (2013.01); C08K 5/5419 (2013.01); C08K 7/28 (2013.01); C08L 71/02 (2013.01); C08K 2003/2241 (2013.01); C08K 2003/265 (2013.01); C08L 63/00 (2013.01); C08L 71/08 (2013.01); C08L 2205/025 (2013.01); C08L 2205/035 (2013.01)

(58) Field of Classification Search
CPC . C08L 71/02; C08L 63/00–10; C09D 171/02; C09D 163/00–10; C09J 171/02; C09J 163/00–10; C08J 2371/02; C08J 2363/001; C08J 2363/00–10; C08G 65/336; C08G 59/32
See application file for complete search history.

(56) References Cited

U.S. PATENT DOCUMENTS

| | | | |
|---|---|---|---|
| 5,034,473 A | 7/1991 | Schultz et al. | |
| 2015/0368466 A1* | 12/2015 | Kelch | C08G 18/5024 523/402 |
| 2019/0040253 A1* | 2/2019 | Kasemi | C08G 65/336 |

FOREIGN PATENT DOCUMENTS

| | | |
|---|---|---|
| CN | 105219337 A | 1/2016 |
| CN | 105567148 A | 5/2016 |
| JP | 03106927 A | 5/1991 |

OTHER PUBLICATIONS

International Search Report, and English Translation thereof, for International Application No. PCT/CN2017/119482, dated Sep. 20, 2018 (7 pages).

(Continued)

*Primary Examiner* — Kregg T Brooks
(74) *Attorney, Agent, or Firm* — Kagan Binder, PLLC

(57) ABSTRACT

A low-modulus high-adhesion silane-modified polyether sealant for prefabricated buildings is provided by including a composition A and a composition B, wherein the composition A includes silane-modified polyether, plasticizer, hydroxy-terminated branched polyether, branched polyether epoxy resin, coupling agent, thixotropic agent, silica, reinforcing filler A, hollow glass microspheres and toner, and the composition B includes plasticizer, hydroxy-terminated branched polyether, light stabilizer, reinforcing filler B, organotin catalyst and amine curing agent. The present disclosure also optimized the various ingredients in the silane-modified polyether sealant, and a formulation of sealant having the best bonding effect was obtained. The two-composition polyether sealant system has good compatibility, greatly improves the adhesive properties thereof, achieves a good adhesion and waterproofing effect without needing to be used with a priming coating, and also avoids the risk of water leakage caused by misoperation in the applying of the priming coating existing in the prior art.

20 Claims, No Drawings

(51) Int. Cl.
C08K 3/26 (2006.01)
C08L 63/00 (2006.01)
C08L 71/08 (2006.01)

(56) References Cited

OTHER PUBLICATIONS

Zhang et al., "Advances in Hyperbranched Epoxy Resin and Their Prospects of Application", Adhesion, vol. 26, No. 5, p. 33, Oct. 10, 2005, (4 pages).

* cited by examiner

LOW-MODULUS HIGH-ADHESION SILANE-MODIFIED POLYETHER SEALANT FOR PREFABRICATED BUILDING, AND PREPARATION METHOD THEREFOR

TECHNICAL FIELD

The present disclosure belongs to the field of building materials and manufacturing thereof, particularly relates to a low-modulus high-adhesion silane-modified polyether sealant for prefabricated buildings and preparation methods thereof.

BACKGROUND

Prefabricated building means building a house like building blocks, that is, the main components of a house, especially precast concrete PC components, are produced at factories and assembled on site. Such mode of production has many advantages such as high building efficiency, low resource and energy consumption, less environmental pollution, less on-site constructors, and high turnover of fund and equipment. It has been well developed in some countries such as European countries, USA and Japan. And at present, China is also strongly supporting the development of prefabricated buildings. In 2016, Premier Li Keqiang proposed in the national two sessions that the proportion of prefabricated buildings in new buildings in the next 10 years should reach 30%. The prefabricated buildings will have a better market prospect in the future.

There are a large number of joints in the prefabricated buildings that need to be performed waterproof sealing treatment during assembling process, especially the joints of exterior wall. The sealant is the first line of defense for waterproof sealing, and its performance will directly affect the waterproof sealing effect. As the joints of the prefabricated buildings may be shifted their positions due to thermal expansion and contraction of the prefabricated components, wind pressure and foundation settlement, so it is necessary to use a sealant product with low modulus and high displacement capability. By adjustment on the formulation of the silane-modified polyether sealant, one can make the product have the characteristics of low modulus, high resistance against displacements, good elasticity and good adhesions to substrates, and be very suitable for sealing the joints of the prefabricated buildings. The current commercial silane-modified polyether sealant (MS sealant) for prefabricated buildings include two types of products, i.e., one-composition product and two-composition product. The one-composition low-modulus silane-modified polyether sealant has the advantages of low modulus, good flexibility, good adhesions to prefabricated building materials (e.g. cement concretes, steels, etc.), simple operation during construction, and so on, but the one-composition silane-modified polyether sealant needs high-temperature dehydration during the process of production, which is relatively complicated. In addition, the one-composition silane-modified polyether sealant is mainly cured by moisture from the surface to the inside, and therefore has a disadvantage that the deep portion of the sealant has a slow curing speed. If the joints of the prefabricated buildings occurring displacement changes when the sealant is not completely cured, there is a risk of adhesive failure. The two-composition low-modulus silane-modified polyether sealant has the advantages of low modulus, good flexibility, simple production process, no need for high-temperature dehydration during the process of production, fast deep-layer curing, small changes of curing rate with external environment, and so on. The two-composition low-modulus silane-modified polyether sealant is cured by using its own water, therefore the exterior and interior of the sealant layer are simultaneously cured, which overcomes the shortcoming of the slow deep-layer curing of the one-composition silane-modified polyether sealant, and is relatively suitable for the joint sealing of the prefabricated building plates with large displacement changes. However, the existing two-composition low-modulus silane-modified polyether sealant has substantially no adhesion to the substrate, and its adhesion to the substrate is completely relying on the priming coating. If the operation is improper during the construction process and as a result the priming coating is not well brushed, it will bring a serious risk of water leakage. In addition, the use of priming coating adds a procedure, makes the operation be more complicated, and the solvent contained in the priming coating is harmful to human body and environment.

Therefore, it is necessary to develop a two-composition low-modulus silane-modified polyether sealant which having a good adhesion.

SUMMARY

Based on this, aimed at solving the above problems, the present disclosure provides a low-modulus, high-adhesion, silane-modified polyether sealant for prefabricated buildings.

The specific technical solutions are as follows: A low-modulus high-adhesion silane-modified polyether sealant for prefabricated buildings, comprising, in parts by weight:

| composition A: | |
|---|---|
| silane-modified polyether | 20-40 parts; |
| plasticizer | 0-10 parts; |
| hydroxy-terminated branched polyether | 0-30 parts; |
| branched polyether epoxy resin | 1-5 parts; |
| coupling agent | 0.5-3 parts; |
| thixotropic agent | 1-3 parts; |
| silica | 0-10 parts; |
| reinforcing filler A | 20-50 parts; |
| hollow glass microspheres | 0-8 parts; |
| toner | 1-5 parts; |

| composition B: | |
|---|---|
| plasticizer | 0-3 parts; |
| hydroxy-terminated branched polyether | 0-3 parts; |
| light stabilizer | 0.2-1 parts; |
| reinforcing filler B | 1-5 parts; |
| organotin catalyst | 0.3-1.2 parts; |
| amine curing agent | 0.5-3 parts; | wherein, the parts by weight of the plasticizer and the parts by weight of the hydroxy-terminated branched polyether are not 0 at the same time.

In some embodiments, the branched polyether epoxy resin is: one or two of branched polyether epoxy resin TBEPO and branched polyether epoxy resin FBEPO, the structure of the branched polyether epoxy resin TBEPO is:

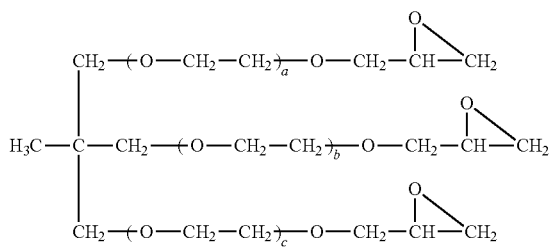

wherein, 1≤a≤25, 1≤b≤25, 1≤c≤25, 3≤a+b+c≤70;
the structure of the branched polyether epoxy resin FBEPO is:

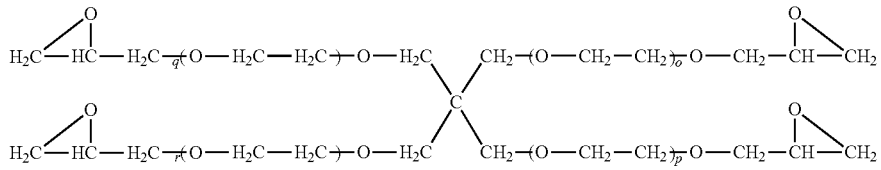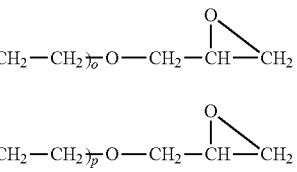

wherein, 1≤o≤15, 1≤p≤15, 1≤q≤15, 1≤r≤15, 4≤o+p+q+r≤40.

In some embodiments, the silane-modified polyether polymer has the structural features as follows:

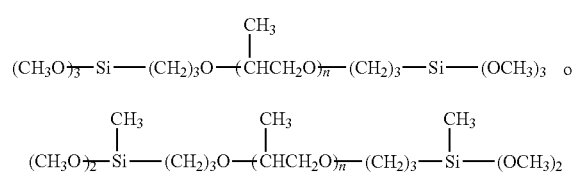

The silane-modified polyether polymer has a viscosity range of 6-82 Pa·s at 25° C.

In some embodiments, the branched polyether epoxy resin is a mixture of the branched polyether epoxy resin TBEPO and the branched polyether epoxy resin FBEPO at a ratio of 3:(1.8-2.2).

In some embodiments, the silane-modified polyether is a mixture of a silane-modified polyether with a viscosity of 8 Pa·s and a silane-modified polyether with a viscosity of 40 Pa·s at a ratio of 22:(7-9).

In some embodiments, the plasticizer is one or more of dioctyl phthalate, diisodecyl phthalate, diisononyl phthalate, dibutyl phthalate, dioctyl adipate, diisodecyl adipate, dioctyl sebacate, diisooctyl sebacate, diphenyl octyl phosphate, cresyl diphenyl phosphate, and polypropylene glycol.

In some embodiments, the hydroxy-terminated branched polyether is one or two of polyether triols and pentaerythritol polyether tetrols.

In some embodiments, the thixotropic agent is one or more of polyamide wax, hydrogenated castor oil, and organobentonite.

In some embodiments, the reinforcing filler A is one or more of heavy calcium carbonate, nano-active calcium carbonate, silica powder, and kaolin.

In some embodiments, the reinforcing filler B is one or more of heavy calcium carbonate, nano-active calcium carbonate, silica powder, and kaolin.

In some embodiments, the toner is titanium dioxide and/or carbon black.

In some embodiments, the light stabilizer is one or more of hindered amine light is stabilizer and benzotriazole light stabilizer.

In some embodiments, the hindered amine light stabilizer is bis(2,2,6,6-tetramethyl-4-piperidinyl)sebacate.

In some embodiments, the benzotriazole light stabilizer is 2-(5-chloro(2H)-benzotriazol-2-yl)-4-(methyl)-6-(tert-butyl)phenol.

In some embodiments, the organotin catalyst is one or more of tin diethylhexanoate, dibutyltin dilaurate, dioctyltin diacetate, stannous octoate, and diorganotin bis(β-diketone ester).

In some embodiments, the amine curing agent is one or more of 1,3-cyclohexanebis(methylamine), isophorone diamine, and polyether amine D-230.

The present disclosure also provides a preparation method of the above low-modulus high-adhesion silane-modified polyether sealant for prefabricated buildings.

The specific technical solutions are as follows: The preparation method of the above low-modulus high-adhesion silane-modified polyether sealant for prefabricated buildings comprises the following steps of:

(1) Composition A: a. adding the silane-modified polyether, the plasticizer, the hydroxyl-terminated branched polyether, the branched polyether epoxy resin, the thixotropic agent, the silica and the toner to a planetary cylinder, stirring; b. adding the reinforcing filler A, dispersing and stirring under vacuum; c. unloading vacuum, adding the hollow glass microspheres to the above planetary cylinder, stirring under vacuum; d. cooling and unloading vacuum, then adding the coupling agent, stirring under vacuum conditions, then unloading vacuum, and discharging to obtain the composition A;

(2) Composition B: a. adding the plasticizer, the hydroxyl-terminated branched polyether, the light stabilizer and the reinforcing filler B to another planetary cylinder, stirring; b. unloading vacuum, then adding the organotin catalyst and the amine curing agent, and stirring under vacuum conditions; c. unloading vacuum, and then discharging to obtain the composition B.

In some embodiments, the above preparation method comprises the following steps of:

(1) Composition A: a. adding the silane-modified polyether, the plasticizer, the hydroxyl-terminated branched polyether, the branched polyether epoxy resin, the thixotropic agent, the silica and the toner to the planetary cylinder, stirring for 5-10 min; b. adding the reinforcing filler A, dispersing and stirring under vacuum degree of 0.08-0.1 MPa for 30-50 min; c. unloading vacuum, adding the hollow glass microspheres to the above planetary cylinder, and stirring under a vacuum degree of 0.08-0.1 MPa for 15-20 min; d. introducing cooling water to the planetary cylinder for cooling, and when the temperature of mixture being decreased to not higher than 50° C., unloading vacuum and adding the coupling agent, then stirring under a vacuum degree of 0.08-0.1 MPa for 15-20 min, and unloading vacuum, and discharging to obtain the composition A;

(2) Composition B: a. adding the plasticizer, the hydroxyl-terminated branched polyether, the light stabilizer and the reinforcing filler B to another planetary cylinder, stirring under a vacuum degree of 0.08-0.1 MPa for 30-50 min; b. unloading vacuum, adding the organotin catalyst and the amine curing agent, stirring under a vacuum degree of 0.08-0.1 MPa for 10-20 min; c. unloading vacuum, and discharging to obtain the composition B.

In some embodiments, the preparation method of the branched polyether epoxy resin above mentioned is as follows:

(1) heating polyether polyols, vacuum dehydrating, reacting with epichlorohydrin by using boron trifluoride-diethyl ether complex as a catalyst, and removing unreacted small molecules;

(2) adding an appropriate amount of toluene for diluting, then adding excess solid sodium hydroxide, extracting organic phase, and then removing the solvent and drying to obtain the product.

In some embodiments, the preparation method of the branched polyether epoxy resin above mentioned is as follows:

(1) vacuum dehydrating polyether polyols at 100-150° C., then reacting with epichlorohydrin by using boron trifluoride-diethyl ether complex as a catalyst in a nitrogen atmosphere at 55-65° C. for 5-10 h, then removing unreacted small molecules; the boron trifluoride-diethyl ether complex accounting for 0.3-1.0% of the total mass of the polyether polyols and the epichlorohydrin;

(2) cooling down to 25-50° C., and adding an appropriate amount of toluene for diluting, adding excess solid sodium hydroxide, incubating for 4-6 h, extracting the organic phase solution, and then removing the solvent and drying to obtain the product.

Based on the above-mentioned technical solutions, the present disclosure has the following beneficial effects:

The low-modulus high-adhesion silane-modified polyether sealant for prefabricated buildings of the present disclosure is a two-composition silane-modified polyether sealant, wherein the two compositions A and B thereof are mixed and then cured by their own water at the exterior and interior of the sealant simultaneously, which can overcome the shortcoming of slow curing of the one-composition silane-modified polyether sealant, and has an advantage of fast curing in deep layer. Among them, in the Composition A, the branched polyether epoxy resin is used as an adhesions promoter for cooperating with the hydroxy-terminated branched polyether, so that the two-composition polyether sealant system has good compatibility, and it greatly improves the adhesive properties of said two-composition silane-modified polyether sealant to precast component materials used in prefabricated buildings, achieves a good adhesion and waterproofing effect without needing to be used with a priming coating, and also avoids the risk of water leakage caused by misoperation in the applying of the priming coating existing in the prior art.

Moreover, the present disclosure also optimized the various components in the silane-modified polyether sealant. The sealant prepared by the two-composition polyether sealant system has a better bonding effect due to mixing the branched polyether epoxy resin TBEPO and the branched polyether epoxy resin FBEPO at a ratio of 3:(1.8-2.2) and realizing the compounding between the components of silane-modified polyether and hydroxy-terminated branched polyether of suitable viscosities.

The low-modulus high-adhesion silane-modified polyether sealant for prefabricated buildings of the present disclosure does not require high-temperature dehydration during its preparation, the processing is simple, the steps are easy to operate, and the production cost is low, so the sealant is favorable for industrial production and use.

DETAILED DESCRIPTION OF THE EMBODIMENTS

The present disclosure provides a low-modulus high-adhesion silane-modified polyether sealant for prefabricated buildings and preparation method thereof. In order to facilitate the understanding of the present disclosure, the present disclosure will be described in more detail hereinafter with reference to the embodiments, and preferred embodiments of the present disclosure are given below. However, the present disclosure may be embodied in many different forms and is not limited to the embodiments described herein. Rather, these embodiments are provided for the purpose of making the understanding of the disclosure of the present invention be more thorough and complete.

Unless otherwise defined, all technical and scientific terms used herein have the same meaning as commonly understood by skilled person in the art to which this disclosure belongs. The terms used in the specification of the present disclosure are for the purpose of describing specific embodiments only and are not intended to limit the present disclosure. The term "and/or" used herein includes any and all combinations of one or more of the associated listed items.

Each technical feature of the embodiments described below may be combined arbitrarily. To simplify the description, not all the possible combinations of the technical features in the following embodiments are described. However, all of the combinations of these technical features should be considered as within the scope of the present specification, as long as such combinations do not contradict with each other.

Example 1

The present example provides a branched polyether epoxy resin and preparation method thereof, the method comprising the following steps of:

(1) (1) weighing 768 g of pentaerythritol polyether tetrol PP150, heating up to 120° C. and dehydrating and degassing under vacuum for 20 min, then introducing dry nitrogen and cooling to room temperature, adding 5.62 g of boron trifluoride-diethyl ether complex as a catalyst, and stirring with a magnetic stirrer;

(2) warming to 60±2° C., slowly adding 356 g of epichlorohydrin dropwise with a constant-pressure funnel over 2 h under stirring, then insulating for 6 h, and then removing unreacted epichlorohydrin under vacuum;

(3) cooling down to 45±2° C. and adding an appropriate amount of toluene for diluting, then adding 112.4 g of excess solid sodium hydroxide in multiple portions over 2 h, and insulating for 6 h;

(4) suction filtering the product, collecting filtrate with a separating funnel and extracting organic phase with toluene, and then washing with distilled water to neutral;

(5) pouring the organic phase into a beaker, placing in a blast drying oven at 120° C. for 12 h for removing the solvent, then vacuum desolvating in a vacuum drying oven at 120° C. for 1 h to obtain a low-viscosity liquid branched polyether epoxy resin FBEPO with a good fluidity, a measured epoxy value of 0.63 and a viscosity of 560 mPa·s.

The chemical reactions involved in the above steps are as follows:

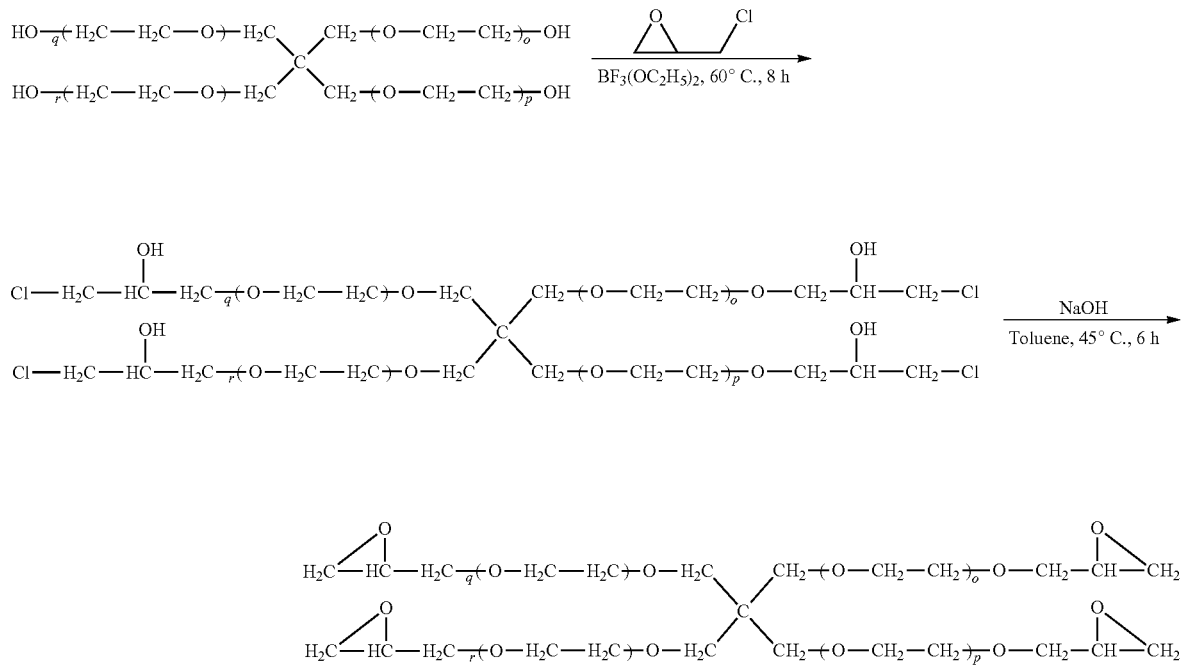

wherein, 1≤o≤15, 1≤p≤15, 1≤q≤15, 1≤r≤15, 4≤o+p+q+r≤40.

Example 2

The present example provides a branched polyether epoxy resin and a preparation method thereof, the method comprising the following steps of:

(1) weighing 1450 g of polyether triols N330, heating up to 120° C. and dehydrating and degassing under vacuum for 30 min, then introducing dry nitrogen and cooling to room temperature, adding 7.96 g of boron trifluoride-diethyl ether complex as a catalyst, and stirring with a magnetic stirrer;

(2) warming to 60±0.5° C., slowly adding 142 g of epichlorohydrin dropwise with a constant-pressure funnel over 2 h under stirring, then insulating for 8 h, and then removing unreacted epichlorohydrin under vacuum;

(3) cooling down to 45±0.5° C. and adding an appropriate amount of toluene for diluting, then adding 159.2 g of solid sodium hydroxide in multiple portions over 2 h, and insulating for 4 h;

(4) suction filtering the product, collecting filtrate with a separating funnel and extracting the organic phase with toluene, and then washing with distilled water to neutral;

(5) pouring the organic phase into a beaker, placing in a blast drying oven at 120° C. for 12 h for removing the solvent, then vacuum desolvating in a vacuum drying oven at 120° C. for 1 h to obtain a low-viscosity liquid branched polyether epoxy resin TBEPO with a good fluidity, a measured epoxy value of 0.12 and a viscosity of 2800 mPa·s.

The chemical reactions involved in the above steps are as follows:

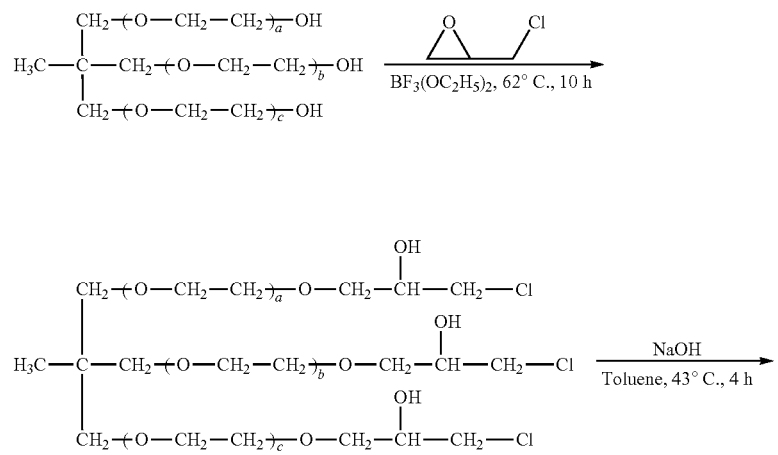

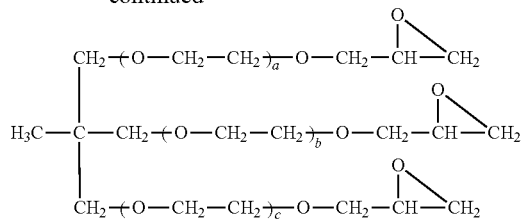

wherein, 1≤a≤25, 1≤b≤25, 1≤c≤25, 3≤a+b+c≤70;

Example 3

The low-modulus high-adhesion silane-modified polyether sealant for prefabricated buildings of the present example, comprising, in parts by weight:

| Composition A: | |
|---|---|
| silane-modified polyether | 20 parts; |
| hydroxy-terminated branched polyether (pentaerythritol polyether tetrol PP150) | 23 parts; |
| branched polyether epoxy resin FBEPO | 3 parts; |
| coupling agent (isocyanatopropyltrimethoxysilane) | 2 parts; |
| thixotropic agent (polyamide wax) | 2 parts; |
| silica | 5 parts; |
| reinforcing filler A (nano-active calcium carbonate) | 36 parts; |
| hollow glass microspheres | 8 parts; |
| toner (titanium dioxide) | 2 parts; |

| Composition B: | |
|---|---|
| hydroxy-terminated branched polyether (pentaerythritol polyether tetrol PP150) | 4 parts; |
| light stabilizer (bis(2,2,6,6-tetramethyl-4-piperidinyl)sebacate) | 0.3 parts; |
| reinforcing filler B (heavy calcium carbonate) | 3.6 parts; |
| organotin catalyst (dibutyltin dilaurate) | 0.4 parts; |
| amine curing agent (1,3-cyclohexanebis(methylamine)) | 0.9 parts; |
| amine curing agent (polyether amine D-230) | 0.8 parts. |

Wherein, the above silane-modified polyether has a viscosity of 40 Pa·s and has the structural features as follows:

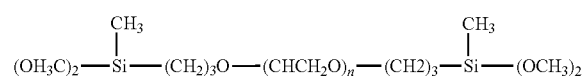

The preparation method of the low-modulus high-adhesion silane-modified polyether sealant for prefabricated buildings of the present example comprises the following steps of:

1. Preparing the composition A:
   (1) adding the above silane-modified polyether, pentaerythritol polyether tetrol PP150, the branched polyether epoxy resin FBEPO prepared in example 1, polyamide wax, silica, titanium dioxide to a planetary cylinder, stirring for 8 min;
   (2) adding nano-active calcium carbonate thereto, stirring under vacuum degree of 0.08-0.1 MPa for 50 min;
   (3) unloading vacuum, adding hollow glass microspheres to the above planetary cylinder, stirring under a vacuum degree of 0.08-0.1 MPa for 15 min;
   (4) introducing cooling water to the planetary cylinder to cool, after cooling down the temperature of the mixture to below 50° C., unloading vacuum and then adding isocyanatopropyltrimethoxysilane, stirring under a vacuum degree of 0.08-0.1 MPa for 15 min, then unloading vacuum, and discharging to obtain the product.

2. Preparing the Composition B:
   (1) adding pentaerythritol polyether tetrol PP150, bis(2,2,6,6-tetramethyl-4-piperidinyl)sebacate, and heavy calcium carbonate to a planetary cylinder, stirring under a vacuum degree of 0.08-0.1 MPa for 30 min;
   (2) unloading vacuum, adding the dibutyltin dilaurate, the 1,3-cyclohexanebis(methylamine) and the polyether amine D-230, stirring under a vacuum degree of 0.08-0.1 MPa for 15 min;
   (3) unloading vacuum, and discharging to obtain the product.

3. When in use, the compositions A and B were mixed at a mass ratio of 10:1, mixing uniformly with a special two-composition stirrer, extracting the sealant with a special two-composition sealant gun and then applying the sealant.

Example 4

The low-modulus high-adhesion silane-modified polyether sealant for prefabricated buildings of the present example, comprises, in parts by weight:

| Composition A: | |
|---|---|
| silane-modified polyether | 28 parts; |
| plasticizer (dioctyl phthalate) | 5 parts; |
| hydroxy-terminated branched polyether (polyether triol N330) | 20 parts; |
| branched polyether epoxy resin TBEPO | 1 part; |
| coupling agent (γ-glycidyloxypropyltrimethoxysilane) | 3 parts; |
| thixotropic agent (hydrogenated castor oil) | 2 parts; |
| silica | 6 parts; |
| reinforcing filler A (nano-active calcium carbonate) | 20 parts; |
| reinforcing filler A (silica powder) | 10 parts; |
| hollow glass microspheres | 4 parts; |
| toner (carbon black) | 1 part; |

| Composition B: | |
|---|---|
| plasticizer (dibutyl phthalate) | 1.6 parts; |
| hydroxy-terminated branched polyether (polyether triol N330) | 3 parts; |
| light stabilizer (bis(2,2,6,6-tetramethyl-4-piperidinyl)sebacate) | 0.5 parts; |
| reinforcing filler B (nano-active calcium carbonate) | 3.8 parts; |
| organotin catalyst (tin diethylhexanoate) | 0.6 parts; |
| amine curing agent (1,3-cyclohexanebis(methylamine)) | 0.3 parts; |
| amine curing agent (polyether amine D-230) | 0.2 parts. |

The above silane-modified polyether has a viscosity of 40 Pa·s and has the structural features as follows:

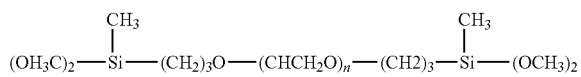

The preparation method of the low-modulus high-adhesion silane-modified polyether sealant for prefabricated buildings of the present example comprises the following steps of:

1. Preparing Composition A:
(1) adding silane-modified polyether, dioctyl phthalate, polyether triol N330, branched polyether epoxy resin TBEPO, hydrogenated castor oil, silica and carbon black to a planetary cylinder, stirring for 10 min;
(2) adding nano-active calcium carbonate and silica powder, dispersing and stirring under a vacuum degree of 0.08-0.1 MPa for 40 min;
(3) unloading vacuum, adding hollow glass microspheres to the above planetary cylinder, stirring under a vacuum degree of 0.08-0.1 MPa for 15 min;
(4) introducing cooling water to the planetary cylinder for cooling, after cooling down the temperature of the mixture to below 50° C., unloading vacuum and adding isocyanatopropyltrimethoxysilane, stirring under a vacuum degree of 0.08-0.1 MPa for 18 min, unloading vacuum, and discharging to obtain the composition A.

2. Preparing composition B:
(1) adding dibutyl phthalate, polyether triol N330, bis(2,2,6,6-tetramethyl-4-piperidinyl)sebacate and nano-active calcium carbonate to a planetary cylinder, and stirring under a vacuum degree of 0.08-0.1 MPa for 50 min;
(2) unloading vacuum, adding tin diethylhexanoate, 1,3-cyclohexanebis(methylamine) and polyether amine D-230, and stirring under a vacuum degree of 0.08-0.1 MPa for 15 min;
(3) unloading vacuum and discharging to obtain the composition B.

3. When in use, the compositions A and B were mixed at a mass ratio of 10:1, mixing uniformly with a special two-composition stirrer, and extracting sealant stock with a special two-composition sealant gun to apply the sealant.

Example 5

The low-modulus high-adhesion silane-modified polyether sealant for prefabricated buildings of the present example, comprises, in parts by weight:

| Composition A: | |
| --- | --- |
| silane-modified polyether (40 Pa · s) | 18 parts; |
| silane-modified polyether (13 Pa · s) | 5 parts; |
| hydroxy-terminated branched polyether (polyether triol N330) | 25 parts; |
| hydroxy-terminated branched polyether (pentaerythritol polyether tetrol PP150) | 5 parts; |
| branched polyether epoxy resin FBEPO | 2 parts; |
| coupling reagent (γ-methacryloxypropyltrimethoxysilane) | 3 parts; |
| thixotropic agent (organobentonite) | 3 parts; |
| silica | 10 parts; |
| reinforcing filler A (nano-active calcium carbonate) | 13 parts; |
| reinforcing filler A (heavy calcium carbonate) | 10 parts; |
| hollow glass microspheres | 3 parts; |
| toner (titanium dioxide) | 3 parts; |

| Composition B: | |
| --- | --- |
| plasticizer (cresyl diphenyl phosphate) | 2 parts; |
| hydroxy-terminated branched polyether (pentaerythritol polyether tetrol PP150) | 2 parts; |
| light stabilizer (2-(5-chloro(2H)-benzotriazol-2-yl)-4-(methyl)-6-(tert-butyl)phenol) | 0.6 parts; |
| reinforcing filler B (nano-active calcium carbonate) | 3.6 parts; |
| organotin catalyst (dioctyltin diacetate) | 0.5 parts; |
| amine curing agent (1,3-cyclohexanebis(methylamine)) | 0.3 parts; |
| amine curing agent (isophorone diamine) | 1 part. |

Two kinds of silane-modified polyethers of 40 Pa·s and 13 Pa·s respectively were used in the above compositions, and were mixed at a ratio of 18:5, and the above silane-modified polyethers have the structural features as follows:

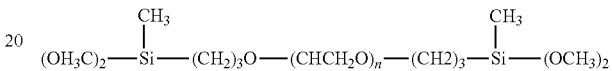

The preparation method of the low-modulus high-adhesion silane-modified polyether sealant for prefabricated buildings of the present example comprises the following steps of:

1. Preparing composition A:
(1) adding silane-modified polyether, dioctyl phthalate, polyether triol N330, pentaerythritol polyether tetrol PP150, branched polyether epoxy resin FBEPO, organobentonite, silica and titanium dioxide to a planetary cylinder, and stirring for 10 min;
(2) adding nano-active calcium carbonate and heavy calcium carbonate, dispersing and stirring under a vacuum degree of 0.08-0.1 MPa for 45 min;
(3) unloading vacuum, adding hollow glass microspheres to the above planetary cylinder, stirring under a vacuum degree of 0.08-0.1 MPa for 20 min;
(4) introducing cooling water to the planetary cylinder for cooling, after cooling down the temperature of the mixture to below 50° C., unloading vacuum and adding γ-methacryloxypropyltrimethoxysilane, then stirring under a vacuum degree of 0.08-0.1 MPa for 20 min, unloading vacuum and discharging to obtain the composition A.

2. Preparing Composition B:
(1) adding cresyl diphenyl phosphate, pentaerythritol polyether tetrol PP150, 2-(5-chloro(2H)-benzotriazol-2-yl)-4-(methyl)-6-(tert-butyl)phenol, and nano-active calcium carbonate to a planetary cylinder, stirring under a vacuum degree of 0.08-0.1 MPa for 45 min;
(2) unloading vacuum, adding dioctyltin diacetate, 3-cyclohexanebis(methylamine) and isophorone diamine, and stirring under a vacuum degree of 0.08-0.1 MPa for 15 min;
(3) unloading vacuum and discharging to obtain the composition B.

3. When in use, the compositions A and B were mixed at a mass ratio of 10:1, mixing uniformly with a special two-composition stirrer, and extracting sealant stock with a special two-composition sealant gun to apply the sealant.

Example 6

The low-modulus high-adhesion silane-modified polyether sealant for prefabricated buildings of the present example, comprises, in parts by weight:

| Composition A: | |
| --- | --- |
| silane-modified polyether (40 Pa · s) | 22 parts; |
| silane-modified polyether (8 Pa · s) | 8 parts; |
| plasticizer (polypropylene glycol) | 10 parts; |
| hydroxy-terminated branched polyether (pentaerythritol polyether tetrol PP150) | 15 parts; |
| branched polyether epoxy resin TBEPO | 3 parts; |
| branched polyether epoxy resin FBEPO | 2 parts; |
| coupling reagent (γ-methacryloxypropyltrimethoxysilane) | 0.5 parts; |
| thixotropic agent (polyamide wax) | 2 parts; |
| thixotropic agent (organobentonite) | 1 part; |
| silica | 3 parts; |
| reinforcing filler A (nano-active calcium carbonate) | 12 parts; |
| reinforcing filler A (heavy calcium carbonate) | 13 parts; |
| hollow glass microspheres | 6 parts; |
| toner (titanium dioxide) | 2.5 parts; |

| Composition B: | |
| --- | --- |
| hydroxy-terminated branched polyether (polyether triol N330) | 2.2 parts; |
| light stabilizer (2-(5-chloro(2H)-benzotriazol-2-yl)-4-(methyl)-6-(tert-butyl)phenol) | 0.4 parts; |
| reinforcing filler B (kaolin) | 4 parts; |
| organotin catalyst (diorganotin bis(β-diketone ester)) | 0.4 parts; |
| amine curing agent (1,3-cyclohexanebis(methylamine)) | 1.6 parts; |
| amine curing agent (polyether amine D-230) | 1.4 parts. |

Two kinds of silane-modified polyethers of 40 Pa·s and 8 Pa·s respectively were used in the above compositions, and were mixed at a ratio of 22:8, the silane-modified polyethers have the structural features as follows:

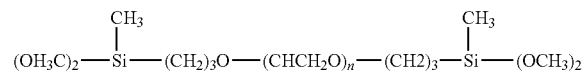

$$(OH_3C)_2-Si(CH_3)-(CH_2)_3O-(CHCH_2O)_n-(CH2)_3-Si(CH_3)-(OCH_3)_2$$

The preparation method of the low-modulus high-adhesion silane-modified polyether sealant for prefabricated buildings of the present example, comprises the following steps of:

1. Preparing composition A:
(1) adding silane-modified polyether, polypropylene glycol, pentaerythritol polyether tetrol PP150, branched polyether epoxy resin TBEPO, branched polyether epoxy resin FBEPO, polyamide wax, organobentonite, silica and titanium dioxide to a planetary cylinder, stirring for 5 min;
(2) adding nano-active calcium carbonate and heavy calcium carbonate, dispersing and stirring under vacuum degree of 0.08-0.1 MPa for 50 min;
(3) unloading vacuum, adding hollow glass microspheres to the above planetary cylinder, stirring under a vacuum degree of 0.08-0.1 MPa for 20 min;
(4) introducing cooling water to the planetary cylinder for cooling, after cooling down the temperature of the mixture to below 50° C., unloading vacuum and adding γ-methacryloxypropyltrimethoxysilane, then stirring under a vacuum degree of 0.08-0.1 MPa for 15 min, unloading vacuum, and discharging to obtain the composition A.

2. Preparing composition B:
(1) adding polyether triol N330, 2-(5-chloro(2H)-benzotriazol-2-yl)-4-(methyl)-6-(tert-butyl)phenol and kaolin to another planetary cylinder, stirring under a vacuum degree of 0.08-0.1 MPa for 30 min;
(2) unloading vacuum, adding diorganotin bis(β-diketone ester), 1,3-cyclohexanebis(methylamine) and polyether amine D-230, stirring under a vacuum degree of 0.08-0.1 MPa for 20 min;
(3) unloading vacuum and discharging to obtain the composition B.

Example 7

The low-modulus high-adhesion silane-modified polyether sealant for prefabricated buildings of the present example, comprises, in parts by weight:

| Composition A: | |
| --- | --- |
| silane-modified polyether (40 Pa · s) | 23 parts; |
| silane-modified polyether (13 Pa · s) | 7 parts; |
| silane-modified polyether (8 Pa · s) | 10 parts; |
| hydroxy-terminated branched polyether (polyether triol N330) | 10 parts; |
| hydroxy-terminated branched polyether (pentaerythritol polyether tetrol PP150) | 5 parts; |
| branched polyether epoxy resin TBEPO | 4 parts; |
| coupling agent (isocyanatopropyltrimethoxysilane) | 1.5 parts; |
| thixotropic agent (polyamide wax) | 1 part; |
| thixotropic agent (hydrogenated castor oil) | 1 part; |
| silica | 8 parts; |
| reinforcing filler A (nano-active calcium carbonate) | 23 parts; |
| hollow glass microspheres | 5.5 parts; |
| toner (titanium dioxide) | 1 part; |

| Composition B: | |
| --- | --- |
| hydroxy-terminated branched polyether (polyether triol N330) | 4 parts; |
| light stabilizer (bis(2,2,6,6-tetramethyl-4-piperidinyl)sebacate) | 0.2 parts; |
| light stabilizer (2-(5-chloro(2H)-benzotriazol-2-yl)-4-(methyl)-6-(tert-butyl)phenol) | 0.2 parts; |
| reinforcing filler B (nano-active calcium carbonate) | 2.4 parts; |
| organotin catalyst (stannous octoate) | 0.8 parts; |
| amine curing agent (1,3-cyclohexanebis(methylamine)) | 1.4 parts; |
| amine curing agent (polyether amine D-230) | 1.0 part. |

Three kinds of silane-modified polyethers of 40 Pa·s, 13 Pa·s and 8 Pa·s respectively were used in the above compositions, and were mixed according to a certain ratio, the above silane-modified polyethers have the structural features as follows:

$$(OH_3C)_2-Si(CH_3)-(CH_2)_3O-(CHCH_2O)_n-(CH2)_3-Si(CH_3)-(OCH_3)_2$$

The preparation method of the low-modulus high-adhesion silane-modified polyether sealant for prefabricated buildings of the present example, comprises the following steps of:

1. Preparing composition A:
(1) adding silane-modified polyether, polyether triol N330, pentaerythritol polyether tetrol PP150, branched polyether epoxy resin TBEPO, polyamide wax, hydrogenated castor oil, silica and titanium dioxide to a planetary cylinder, stirring for 7 min;
(2) then adding nano-active calcium carbonate, dispersing and stirring under vacuum degree of 0.08-0.1 MPa for 45 min;
(3) unloading vacuum, adding hollow glass microspheres to the planetary cylinder, stirring under a vacuum degree of 0.08-0.1 MPa for 16 min;
(4) introducing cooling water to the planetary cylinder for cooling, after cooling down the temperature of the supplies to below 50° C., unloading vacuum and adding isocyanato-propyltrimethoxysilane, stirring under a vacuum degree of 0.08-0.1 MPa for 20 min, unloading vacuum and discharging to obtain the composition A.

2. Preparing Composition B:

(1) adding polyether triol N330, bis(2,2,6,6-tetramethyl-4-piperidinyl)sebacate, 2-(5-chloro(2H)-benzotriazol-2-yl)-4-(methyl)-6-(tert-butyl)phenol, and nano-active calcium carbonate to a planetary cylinder, stirring under a vacuum degree of 0.08-0.1 MPa for 40 min;

(2) unloading vacuum, adding stannous octoate, 1,3-cyclohexanebis(methylamine) and polyether amine D-230, stirring under a vacuum degree of 0.08-0.1 MPa for 20 min;

(3) unloading vacuum and discharging to obtain the composition B.

3. When in use, the compositions A and B were mixed at a mass ratio of 10:1, mixing uniformly with a special two-composition stirrer, extracting sealant stock with a special two-composition sealant gun and then conducting sealant applying.

Comparative Example 1

The difference between the present Comparative Example and the Example 6 is that no branched polyether epoxy resin was added to the composition A of the present comparative example, the remaining ingredients and preparation methods were the same as that in Example 6.

The performance test was carried out for the low-modulus high-adhesion silane-modified polyether sealants for prefabricated buildings prepared in Examples 3-7 and Comparative Example 1. The specific test standards and test data are shown in Table 1.

TABLE 1

The results of performance tests

| Items | Example 3 | Example 4 | Example 5 | Example 6 | Example 7 | Comparative Example 1 | Test standard |
|---|---|---|---|---|---|---|---|
| Displacement ability (%) | ±25 | ±25 | ±25 | ±25 | ±25 | ±25 | ISO 11600 |
| Elastic recovery rate (%) | 90 | 90 | 91 | 93 | 92 | 90 | ISO 7398 |
| Tensile modulus 23° C. (N/mm2) | 0.23 | 0.20 | 0.24 | 0.26 | 0.25 | 0.19 | ISO 8339 |
| −20° C. | 0.24 | 0.21 | 0.25 | 0.28 | 0.26 | 0.20 | |
| Adhesions at definite elongation | No damage | No damage | No damage | No damage | No damage | Interface damage | ISO 8340 |
| Adhesions after cold draw-hot press | No damage | No damage | No damage | No damage | No damage | Interface damage | ISO 9047 |
| Adhesions at definite elongation after immersion in water | No damage | No damage | No damage | No damage | No damage | Interface damage | ISO 10590 |
| Volume changes rate (%) | 1 | 1 | 1 | 1 | 1 | 1 | ISO 10563 |
| Resistance to flow (mm) | 0 | 0 | 0 | 0 | 0 | 0 | ISO 7390 |

It can be seen from the experimental results in Table 1 that the low-modulus high-adhesion silane-modified polyether sealant for prefabricated buildings of the present disclosure can meet the requirements of various indexes of ISO 11600-F-25LM, and can satisfy the requirements of the joint sealing of the prefabricated buildings. While the product of Comparative Example 1 has no adhesion to substrates when it is not used with priming coating in combination, and cannot satisfy the requirements for use.

The above-mentioned examples are merely illustrative of several embodiments of the present disclosure, and the description thereof is more specific and detailed, but it cannot be understood to limit the scope of the present disclosure. It should be noted that, for those ordinary skilled in the art, several variations and improvements may be made without departing from the concept of the present disclosure, and these are all within the protection scope of the present disclosure. Therefore, the protection scope of the present disclosure shall be defined by the appended claims.

The invention claimed is:

1. A silane-modified polyether sealant for prefabricated buildings, comprising, in parts by weight:

| composition A: | |
|---|---|
| silane-modified polyether | 20-40 parts; |
| plasticizer of the composition A | 0-10 parts; |
| hydroxyl-terminated branched polyether of the composition A | 0-30 parts; |
| branched polyether epoxy resin | 1-5 parts; |
| coupling agent | 0.5-3 parts; |
| thixotropic agent | 1-3 parts; |
| silica | 0-10 parts; |
| reinforcing filler A | 20-50 parts; |
| hollow glass microspheres | 0-8 parts; |
| toner | 1-5 parts; |

| composition B: | |
|---|---|
| plasticizer of the composition B | 0-3 parts; |
| hydroxyl-terminated branched polyether of the composition B | 0-3 parts; |

-continued

| composition B: | |
|---|---|
| light stabilizer | 0.2-1 parts; |
| reinforcing filler B | 1-5 parts; |
| organotin catalyst | 0.3-1.2 parts; |
| amine curing agent | 0.5-3 parts; | wherein, in the composition A, the parts by weight of the plasticizer of the composition A and the parts by weight of the hydroxyl-terminated branched polyether of the composition A are not 0 at the same time, and/or, in the composition B, the parts by weight of the plasticizer of the composition B and the parts by weight of the hydroxyl-terminated branched polyether of the composition B are not 0 at the same time.

2. The silane-modified polyether sealant for prefabricated buildings according to claim 1, wherein the branched polyether epoxy resin is one or two of branched polyether epoxy resin TBEPO and branched polyether epoxy resin FBEPO, wherein, the structure of the branched polyether epoxy resin TBEPO is:

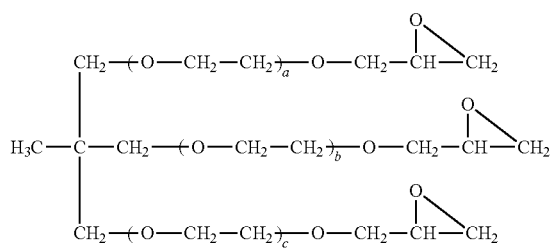

wherein, $1 \leq a \leq 25$, $1 \leq b \leq 25$, $1 \leq c \leq 25$, $3 \leq a+b+c \leq 70$;

the structure of the branched polyether epoxy resin FBEPO is:

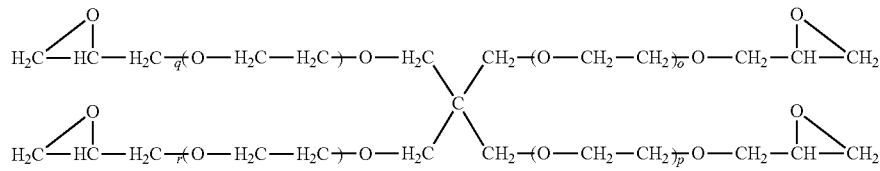

wherein, $1 \leq o \leq 15$, $1 \leq p \leq 15$, $1 \leq q \leq 15$, $1 \leq r \leq 15$, $4 \leq o+p+q+r \leq 40$.

3. The silane-modified polyether sealant for prefabricated buildings according to claim 2, wherein the branched polyether epoxy resin is a mixture of the branched polyether epoxy resin TBEPO and the branched polyether epoxy resin FBEPO at a ratio of 3: (1.8-2.2).

4. The silane-modified polyether sealant for prefabricated buildings according to claim 2, wherein the silane-modified polyether is a mixture of a silane-modified polyether with a viscosity of 8 Pa·s and a silane-modified polyether with a viscosity of 40 Pa·s at a ratio of 22: (7-9).

5. The silane-modified polyether sealant for prefabricated buildings according to claim 1, wherein the silane-modified polyether has a structural feature of:

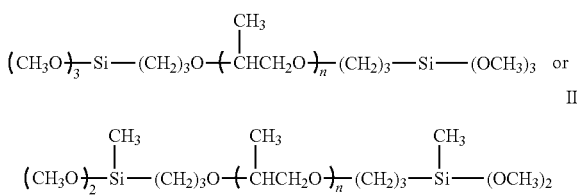

the silane-modified polyether has a viscosity of 6-82 Pa·s at 25° C.

6. The silane-modified polyether sealant for prefabricated buildings according to claim 1, wherein the plasticizer is of the composition A and the plasticizer of the composition B are each independently one or more of dioctyl phthalate, diisodecyl phthalate, diisononyl phthalate, dibutyl phthalate, dioctyl adipate, diisodecyl adipate, dioctyl sebacate, diisooctyl sebacate, diphenyl octyl phosphate, cresyl diphenyl phosphate and polypropylene glycol.

7. The silane-modified polyether sealant for prefabricated buildings according to claim 1, wherein the hydroxyl-terminated branched polyether is of the composition A and the hydroxyl-terminated branched polyether of the composition B are each independently one or two of polyether triols and pentaerythritol polyether tetrols.

8. The silane-modified polyether sealant for prefabricated buildings according to claim 1, wherein the coupling agent is one of γ-methacryloxypropyltrimethoxysilane, γ-glycidoxypropyltrimethoxysilane and isocyanatopropyltrimethoxysilane, or a mixture thereof.

9. The silane-modified polyether sealant for prefabricated buildings according to claim 1, wherein the thixotropic agent is one or more of polyamide wax, hydrogenated castor oil and organobentonite.

10. The silane-modified polyether sealant for prefabricated buildings according to claim 1, wherein the reinforcing filler A and the reinforcing filler B are independently selected from the group consisting of heavy calcium carbonate, nano-active calcium carbonate, silica powder and kaolin.

11. The silane-modified polyether sealant for prefabricated buildings according to claim 1, wherein the toner is titanium dioxide and/or carbon black.

12. The silane-modified polyether sealant for prefabricated buildings according to claim 1, wherein the light stabilizer is one or more of hindered amine light stabilizer and benzotriazole light stabilizer.

13. The silane-modified polyether sealant for prefabricated buildings according to claim 12, wherein the hindered amine light stabilizer is bis(2,2,6,6-tetramethyl-4-piperidinyl)sebacate, and/or the benzotriazole light stabilizer is 2-(5-chloro(2H)-benzotriazol-2-yl)-4-(methyl)-6-(tert-butyl)phenol.

14. The silane-modified polyether sealant for prefabricated buildings according to claim 1, wherein the organotin catalyst is one or more of tin diethylhexanoate, dibutyltin dilaurate, dioctyltin diacetate, stannous octoate and diorganotin bis(β-diketone ester).

15. The silane-modified polyether sealant for prefabricated buildings according to claim 1, wherein the amine curing agent is one or more of 1,3-cyclohexanebis(methylamine), isophorone diamine and polyether amine.

16. The silane-modified polyether sealant for prefabricated buildings according to claim 1, comprising, in parts by weight:

| composition A: | |
|---|---|
| silane-modified polyether with a viscosity of 40 Pa · s | 22 parts; |
| silane-modified polyether with a viscosity of 8 Pa · s | 8 parts; |
| polypropylene glycol | 10 parts; |
| pentaerythritol polyether tetrol | 15 parts; |
| branched polyether epoxy resin TBEPO | 3 parts; |
| branched polyether epoxy resin FBEPO | 2 parts; |
| γ-methacryloxypropyltrimethoxysilane | 0.5 parts; |
| polyamide wax | 2 parts; |
| organobentonite | 1 part; |
| silica | 3 parts; |
| nano-active calcium carbonate | 12 parts; |
| heavy calcium carbonate | 13 parts; |
| hollow glass microspheres | 6 parts; |
| titanium dioxide | 2.5 parts; |

| composition B: | |
|---|---|
| polyether triol | 2.2 parts; |
| (2-(5-chloro(2H)-benzotriazol-2-yl)-4-(methyl)-6-(tert-butyl)phenol) | 0.4 parts; |
| kaolin | 4 parts; |
| diorganotin bis(β-diketone ester) | 0.4 parts; |
| 1,3-cyclohexanebis(methylamine) | 1.6 parts; |
| polyether amine | 1.4 parts; | wherein the structure of the pentaerythritol polyether tetrol is:

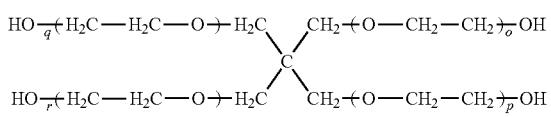

wherein $1 \leq o \leq 15$, $1 \leq p \leq 15$, $1 q \leq 15$, $1 \leq r \leq 15$, $4 \leq o+p+q+r \leq 40$; and wherein the structure of the polyether triol is:

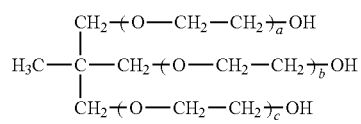

wherein $1 \leq a \leq 25$, $1 \leq b \leq 25$, $1 \leq c \leq 25$, $3 \leq a+b+c \leq 70$.

17. A method for preparing the silane-modified polyether sealant for prefabricated buildings of claim 1, comprising:
(1) preparing composition A:
a. adding the silane-modified polyether, the plasticizer of the composition A, the hydroxyl-terminated branched polyether of the composition A, the branched polyether epoxy resin, the thixotropic agent, the silica and the toner to a planetary cylinder, and stirring;
b. adding the reinforcing filler A, dispersing and stirring under vacuum;
c. unloading vacuum, adding the hollow glass microspheres to the planetary cylinder, and stirring under vacuum; and
d. cooling and unloading vacuum, then adding the coupling agent, stirring under vacuum, and then unloading vacuum and discharging to obtain the composition A;

(2) preparing composition B:
a. adding the plasticizer of the composition B, the hydroxyl-terminated polyether of the composition B, the light stabilizer and the reinforcing filler B to another planetary cylinder, and stirring;
b. unloading vacuum, adding the organotin catalyst and the amine curing agent, and stirring under vacuum; and
c. unloading vacuum and discharging to obtain the composition B.

18. The method according to claim 17, comprising:
(1) preparing composition A:
a. adding the silane-modified polyether, the plasticizer of the composition A, the hydroxyl-terminated branched polyether of the composition A, the branched polyether epoxy resin, the thixotropic agent, the silica and the toner to the planetary cylinder, and stirring for 5-10 min;
b. adding the reinforcing filler A, and dispersing and stirring under a vacuum degree of 0.08-0.1 MPa for 30-50 min;
c. unloading vacuum, adding the hollow glass microspheres to the planetary cylinder, and stirring under a vacuum degree of 0.08-0.1 MPa for 15-20 min; and
d. introducing cooling water to the planetary cylinder for cooling, then unloading vacuum when the temperature of the mixture drops below 50° C., adding the coupling agent, stirring under a vacuum degree of 0.08-0.1 MPa for 15-20 min, and then unloading vacuum and discharging to obtain the composition A;

(2) preparing composition B:
a. adding the plasticizer of the composition B, the hydroxyl-terminated branched polyether of the composition B, the light stabilizer and the reinforcing filler B to another planetary cylinder, and stirring under a vacuum degree of 0.08-0.1 MPa for 30-50 min;
b. unloading vacuum, adding the organotin catalyst and the amine curing agent, and stirring under a vacuum degree of 0.08-0.1 MPa for 10-20 min; and
c. unloading vacuum and discharging to obtain the composition B.

19. The method according to claim 17, wherein the branched polyether epoxy resin is prepared by a process comprising:
(1) heating polyether polyol and vacuum dehydrating, reacting with epichlorohydrin by using boron trifluoride-diethyl ether complex as a catalyst, and removing unreacted small molecules; and
(2) adding an appropriate amount of toluene for diluting, then adding excess solid sodium hydroxide, extracting organic phase, and then removing solvent and drying to obtain the branched polyether epoxy resin.

20. The method according to claim 19, wherein the branched polyether epoxy resin is prepared by a process comprising:
(1) vacuum dehydrating polyether polyol at 100-150° C., reacting with epichlorohydrin by using boron trifluoride-diethyl ether complex as a catalyst in a nitrogen atmosphere at 55-65° C. for 5-10 h, and then removing unreacted small molecules; wherein the boron trifluoride-diethyl ether complex accounts for 0.3-1.0% of the total mass of the polyether polyol and the epichlorohydrin; and
(2) cooling down to 25-50° C., adding an appropriate amount of toluene for diluting, adding excess solid sodium hydroxide, incubating for 4-6 h, then extracting organic phase solution, and removing solvent and drying to obtain the branched polyether epoxy resin.

* * * * *